various patents cited including one for 5,845,149 dated Dec. 1, 1998

United States Patent
Husted et al.

Patent Number: 5,845,149
Date of Patent: Dec. 1, 1998

[54] INDUSTRIAL CONTROLLER WITH I/O MAPPING TABLE FOR LINKING SOFTWARE ADDRESSES TO PHYSICAL NETWORK ADDRESSES

[75] Inventors: Raymond R. Husted; Michael David Yoke, both of Mentor; James A. Meeker, Lyndhurst; Donald Alan Westman, Mentor-on-the-Lake, all of Ohio

[73] Assignee: Allen Bradley Company, LLC, Milwaukee, Wis.

[21] Appl. No.: 630,394

[22] Filed: Apr. 10, 1996

[51] Int. Cl.⁶ .................................................... G06F 12/06
[52] U.S. Cl. ........................ 395/829; 395/823; 395/838; 395/883
[58] Field of Search ..................... 364/146, 188; 395/570, 750.05, 831, 836, 872, 800; 370/50, 286

[56] References Cited

U.S. PATENT DOCUMENTS

| | | | |
|---|---|---|---|
| 3,949,380 | 4/1976 | Barbour et al. | 340/172.5 |
| 4,425,639 | 1/1984 | Acampora et al. | 370/50 |
| 4,591,973 | 5/1986 | Ferris, III et al. | 395/823 |
| 4,809,217 | 2/1989 | Floro et al. | 395/872 |
| 4,918,589 | 4/1990 | Floro et al. | 395/872 |
| 5,032,978 | 7/1991 | Watson et al. | 364/188 |
| 5,065,314 | 11/1991 | Maskovyak | 395/831 |
| 5,142,469 | 8/1992 | Weisenborn | 364/146 |
| 5,162,986 | 11/1992 | Graber et al. | 364/146 |
| 5,274,767 | 12/1993 | Maskovyak | 395/836 |
| 5,386,515 | 1/1995 | Martin et al. | 395/825 |
| 5,444,642 | 8/1995 | Montgomery et al. | 364/550 |
| 5,491,829 | 2/1996 | Kau et al. | 395/800 |
| 5,517,651 | 5/1996 | Huck et al. | 395/570 |
| 5,596,759 | 1/1997 | Miller et al. | 395/750.05 |
| 5,684,792 | 11/1997 | Ishihara | 370/286 |

*Primary Examiner*—Thomas C. Lee
*Assistant Examiner*—Chien Yuan
*Attorney, Agent, or Firm*—Keith M. Baxter; John M. Miller; John J. Horn

[57] ABSTRACT

An industrial controller having a number of addressable I/O modules, employs an I/O map table linking software addresses used for developing the control program to actual physical addresses of the I/O modules on a network. By employing software addresses for connection points to the control process, the program may be developed independent of the topology of the network connecting the processor to the I/O modules and changes in that topology may be made without affecting the control program, but simply by changing the I/O map table. A single change in the I/O map table re-connects an I/O module for all references in the control program.

8 Claims, 3 Drawing Sheets

INDUSTRIAL CONTROLLER WITH I/O MAPPING TABLE FOR LINKING SOFTWARE ADDRESSES TO PHYSICAL NETWORK ADDRESSES

FIELD OF THE INVENTION

The present invention relates to industrial controllers for the real time control of industrial processes, and in particular to an industrial controller having independently addressable input and output modules referenced via address independent mnemonics in the control program.

BACKGROUND OF THE INVENTION

Industrial controllers are special purpose computers used for controlling industrial processes or manufacturing equipment. Under the direction of a stored program, the industrial controller examines a series of inputs reflecting the status of a controlled process or controlled equipment, and changes outputs effecting control of the process or equipment. In the simplest case, the inputs and outputs are binary, that is "ON" or "OFF"; however, analog inputs and outputs taking on a continuous range of values and multi-bit digital values are also used.

The signals received by the industrial controller from the controlled process, and transmitted from the industrial controller to the controlled process, are normally passed through one or more input/output (I/O) modules which serve as electrical interfaces between the controller and the process. In a typical industrial controller, a central computer-like controller communicates with a number of these separate I/O modules, some of which may be spatially remote from the controller and connected to the controller by means of a communication network. Each I/O module has a unique address on the communication network, its "physical address," which may be defined by the path of a message between the controller and the I/O module through various branches of the communication network. Typically, I/O modules will be organized in one or more chassis or racks connected to the communication network by an adapter. In this case, part of the physical address may include the slot number of the chassis in which the I/O module is placed.

By dividing the function of the industrial controller among the central controller and a number of separate I/O modules, I/O data may be efficiently collected and disseminated at spatially separated points in the controlled process. The use of separate I/O modules also permits the industrial controller to be flexibly configured to meet a given control task without the need to purchase and configure unnecessary I/O modules. When additional points of interface between the controller and the process are needed, new or different I/O modules may be connected to the network and hence to the controller.

The modularity of the industrial controller, using separate I/O modules, also improves its serviceability. A failure of a single I/O module requires replacement only of that module, and in some cases does not require stopping the controlled process or machine.

Ideally, for certain critical functions, it would be desirable to have redundant I/O modules in the industrial controller. For example, two identical modules plugged into different adjacent slots of a given I/O rack. In event of a failure of one I/O module, connections from the industrial process to that module could be quickly unplugged and plugged into the back-up module. The control program would then need to be changed so that the central controller will send and receive data from the new I/O module.

At present, reprogramming the control program to change an address of an I/O module is difficult. To change an I/O module address in the control program, the programmer must find each of the many instructions in the control program that receives data from or sends data to the particular I/O module and change the operands of those instructions.

The ability to re-use all or a portion of a control program in similar control situations or at new sites is desirable, especially, when as is often the case, the control program is extremely complex and involves many man-years of programming time to write and perfect. Normally such re-use of a program requires that the network topology and thus the physical addresses of each I/O module used with the new industrial process be identical to that of the original facility in order to avoid extensive modification of the control program that might undo the savings in re-using the program. This need to preserve the physical addresses of the I/O module at any new site significantly reduces the flexibility in the design of the new facility.

During the development of new controlled process, considerable effort must be made to coordinate the activities of the electricians wiring up the I/O modules to the industrial controller with the programmers who must know the physical addresses of the wired I/O modules in order to properly identify the modules' input and output in the program. In the worst case, the programming is delayed until the wiring of the industrial controller is completed, imposing unnecessary delay and expense into the development process.

SUMMARY OF THE INVENTION

The present invention separates the process of developing a control program from the process of physically locating and connecting the I/O modules by establishing a set of separate "software addresses" used in the development of the control program and only later linked to the "physical addresses" of the I/O modules by a separate I/O map table. The use of separate software and physical addresses simplifies changing the location of an I/O module (only one entry in the I/O map table need be changed) and improves the portability of the control program (changes in network topology only affect the I/O map table). The processing overhead of this intermediate linking step between software and physical addresses is eliminated during the running of the industrial controller by compiling the control program before it is run to replace the software addresses with direct addresses to an internal data table that in turn is independently updated with data exchanged with the actual I/O modules.

Specifically then, the present invention provides a method of operating an industrial controller, the industrial controller having a central processor executing a stored controlled program to exchange data with a plurality of input/output modules distributed over a network at physical network addresses. The input/output modules provide points of electrical interface to a controlled process.

At a first step, the control program is entered into the controller, the program having steps where data is exchanged with a particular control point in the controlled process, that control point being designated by a software address. At a next step, an I/O table is entered into the controller relating the software address to a physical network address of a particular input/output module communicating with the control point. Finally, the controller is operated to exchange data with the control point through the particular I/O module at the physical network address related to the software address by the I/O map table.

Thus, it is one object of the invention to permit the control program to be developed without regard to the actual wiring of the I/O modules. The I/O map table, subsequently entered into the controller, provides the necessary linkage between the software addresses and actual physical addresses. In this way, development of software can occur simultaneously with the wiring of the network on the factory floor.

It is yet another object of the invention to make distinct the difference between control points in the program and physical addresses. By employing the I/O map table, the control points may be given designations that relate to the logic of the control program rather than to the physical addresses of the I/O modules, that latter which have little bearing on how the control program works. The I/O map table provides a centralized description of the interface between the program and the I/O modules that may be used to generate documentation of that interface.

It is another object of the invention to simplify the changing of network addresses within the program, for example, when one I/O module is replaced by another at a different physical address. In the present invention, a single change in the I/O map table is all that is necessary to redirect information from the control program to and from a new physical address.

The controller may operate to exchange data with the control point by replacing the software addresses in the control program with addresses in a data table stored in the controller. Data is independently exchanged directly between the particular I/O module and the data table using the relationship between the software address and the physical addresses contained in the I/O map table.

Receipt of data from the I/O modules is accomplished by assigning messages from the particular I/O module with a connection identification number. A connection record is then developed from the I/O map table linking the connection identification number to a particular address in the data table. Upon receipt of messages for the particular I/O module, the connection identification number is found in the connection record to identify the addresses in the data table to receive the message from the particular I/O module.

Transmission of data to the particular I/O module is accomplished by assigning messages to the particular I/O module with a connection identification number and making a list of the messages needed to be transmitted by the control program including their connection identification numbers. On a periodic basis, the data at addresses in the data table, linked by the connection record to the list of connection identification numbers, is transmitted to the particular I/O module, the messages incorporating the connection identification number given by the list.

It is thus another object of the invention to provide the above benefits of separate software and physical addresses without increasing the amount of time required to perform I/O operations. By incorporating the data of the I/O map table into the connections made between I/O modules and the controller during a compilation step, the transfer of data necessary for real time industrial control remains at a high rate.

A similar procedure may be employed to exchange data with other controllers or devices such as user programming terminals. The physical addresses stored in the I/O map table is then the physical address of the other controller and a variable address within that controller normally designated by the variable name.

Thus, it is another object of the invention to extend the above described benefits of separating the development of the control software from the selection of a particular network topology to all communications between the controller and other devices.

The I/O map or connection record may indicate whether the particular data should be forced to a predetermined value contained in a forcing table. At the time of the reading of the connection record, forcing may be detected and the data forced per a separate predefined forcing table.

Thus, it is another object of the invention to provide for individual forcing of particular control points as part of the I/O mapping process without significantly compromising the speed of I/O operations.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

DETAILED DESCRIPTION OF THE PREFERRED EMBODIMENT

Figure 1:
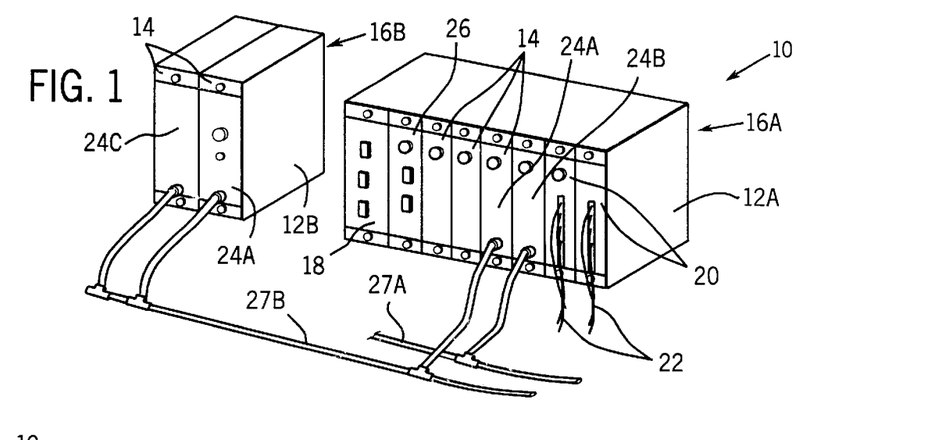
FIG. 1 is a perspective view of an industrial controller having some of its I/O modules contained in the same rack as a central controller and being connected to a remote housing by a communication link.

Referring to FIG. 1, an industrial control system 10 suitable for use with the present invention provides a first and second rack 12A and 12B for holding a number of functional modules 14 electrically interconnected by backplanes 16A and 16B running along the rear of the racks 12A and 12B, respectively. Each module 14 may be individually removed from the rack 12A and 12B thereby disconnecting it from its respective backplane 16 as will be described below for replacement or repair and to allow custom configuration of the industrial control system 10.

The modules 14 within the rack 12A may include, for example, a power supply module 18, a central controller 26, two communication modules 24A and 24B and two I/O modules 20. Power supply module 18 receives an external source of power (not shown) and provides regulated voltages to the other modules 14 by means of conductors on the backplane 16A.

I/O modules 20 provide an interface between inputs from and outputs to external equipment (not shown) via cabling 22 attached to the I/O modules 20 at terminals on their front panels. As is understood in the art, the I/O modules 20 convert input signals on the cables 22 to digital words for transmission on the backplane 16A. The I/O modules 20 also convert other digital words from the backplane 16A to the necessary signal levels for control of equipment.

The communication modules 24A and 24B provide a similar interface between the backplane 16 and one of the two external high speed communication links 27A and 27B forming part of a communication network. The high speed communication links 27A and 27B may connect with other modules 14 or with remote racks of I/O modules 20 or the like as will be described.

Central controller 26 processes information provided by the communication modules 24 and the I/O modules 20 according to a stored program and provides output information to the communication modules 24 and the I/O modules 20 in response to that stored program and received input messages.

Figure 2:
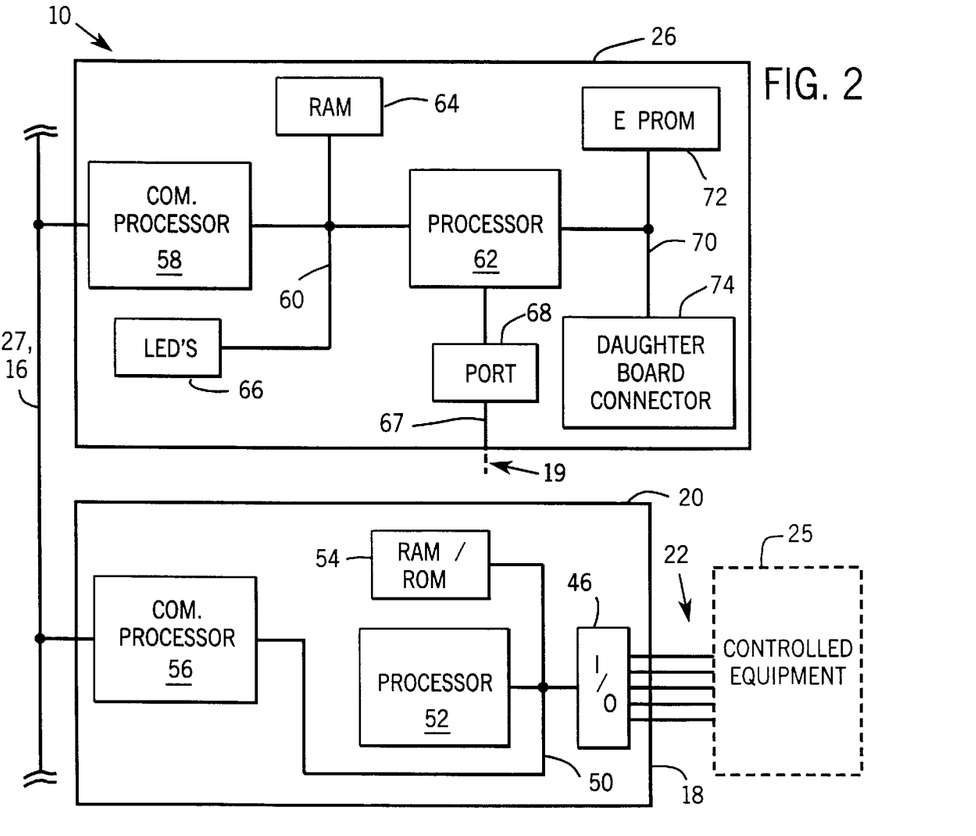
FIG. 2 is a simplified schematic block diagram of a central controller and one I/O module of FIG. 1 showing the memory (64) of the central controller holding a control program and an I/O map table.

Referring now to FIGS. 1 and 2, the signal lines 22 from the controlled equipment 25 are received by the I/O modules 20 at interface circuitry 46. The interface circuitry 46 contains protection circuitry, such as optical isolators, and conversion circuitry, such as analog to digital or digital to analog circuitry, for converting the I/O signals on lines 22 to digital representations that may be transmitted on an internal bus 50 of the I/O modules 20.

The internal bus 50 communicates with an I/O module processor 52, a memory unit 54 composed generally of random access and read-only memory (RAM/ROM) and a communication processor 56 connecting the I/O module 20 to a high speed backplane 16 for communication with the other modules 20 and in particular, the processor 62. The processor 52 thus may receive instructions and programming from central controller 26 as will be described below. The I/O module 20 may be constructed according to methods well understood in the art.

A communication processor 58 is also contained in the processor 62 to handle the communication protocols of the high speed backplane 16 for the links 27. The communication processor 58 relays information between other modules 14 and at an internal bus 60 of the central controller 26. The internal bus 60 is also connected to the processor 62 of the central controller 26 as well as random access memory (RAM) 64 and a front panel LED display 66. The processor 62 provides a separate serial port 68 used for diagnostics and programming and another internal bus 70 communicating with a read-only memory (ROM) 72 and a daughter board connector 74 which may be used for memory expansion on a separate card.

Generally, during operation, the processor 62 reads program instructions from the ROM 72 and transfers data to and from RAM 64, that data representing desired inputs and outputs, the data then interchanged by the communication processor 58 with the I/O modules 20 and thus with the controlled equipment 25. The general architecture and operation of the industrial control system 10 and the I/O module 20 thus far described will be familiar to those of ordinary skill in the art.

CONTROL PROGRAM

Figure 5:
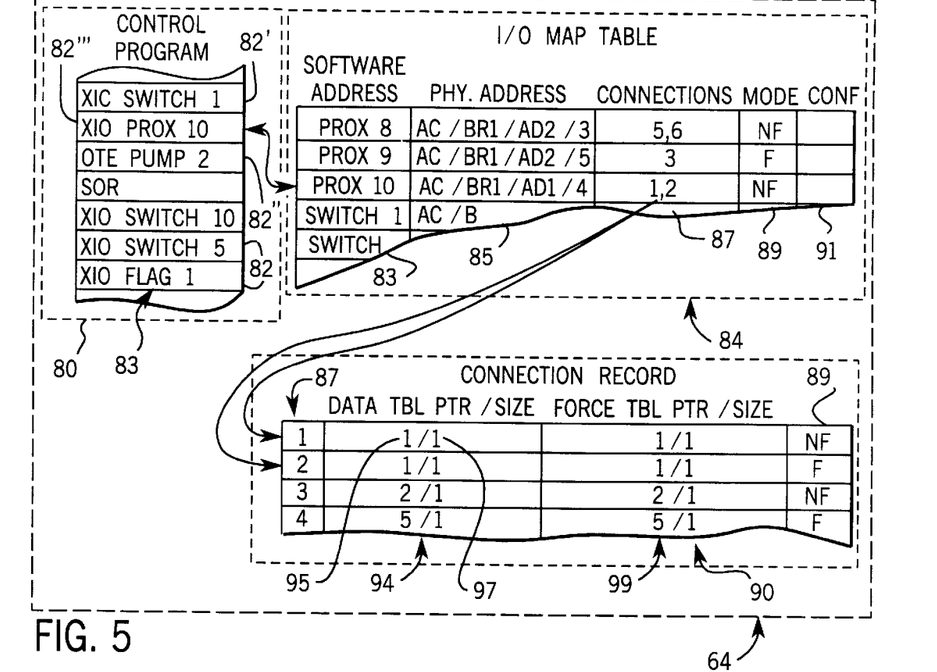
FIG. 5 is a schematic representation of the memory of the controller of FIG. 2 and FIG. 3 showing an I/O map table and connection record used for relating software addresses in the control program to physical addresses of related I/O modules.

Referring now to FIGS. 2 and 5, prior to operation of the industrial control system 10, the RAM 64 of the central controller 26 is loaded with a control program 80 defining the logic of the control of the controlled equipment 25. The control program 80 is composed of a series of computer instructions 82 which together instruct the central controller 26 to provide the necessary control signals to the controlled equipment 25.

In the embodiment shown, the instructions 82 are examples of relay ladder language instructions well known in the art and summarized below in Table I.

TABLE I

| Instruction Mnemonic | Meaning |
| --- | --- |
| SOR | Start of Rung |
| BST | Branch Start |
| XIO | Normally Closed Contact (examine if open) |
| XIC | Normally Open Contact (examine if closed) |
| NXB | Next Branch |
| BND | Branch End |
| OTE | Output Coil (Output Enable) |
| EOR | End of Rung |

Relay ladder language instructions describe interconnections of virtual relay contacts and coils that would receive and produce the necessary control signals to control the controlled equipment 25. Input signals are received by the control program 80 by the execution of input instructions which have as an operand a control point 23 on an I/O module 20. Input instructions include, for example, XIC (examine if closed) or XIO (examine if open) instructions well known in the art of industrial control. Each of these instructions XIC and XIO tests the value of the input signal from a control point 23 designated by its operand. For example, instruction 82' which reads "XIC switch 1" examines for closure of switch 1 which may be a switch within the controlled equipment 25 attached to a particular terminal on an I/O module 20.

Conversely, output signals are output by the control program 80 by the execution of out instructions which have as an operand an output at a control point 23 at an I/O module 20 and include, for example, the OTE (output enable) instruction also well known in the art of industrial control. For example, instruction 82" which reads "OTE pump 2" outputs a signal to the controlled equipment 25 attached to a particular terminal on an I/O module 20.

Other input and output instructions and additional logical instructions are well known in the art and found in modern commercial industrial controllers.

The operands in both of these examples: "switch 1" and "pump 2" describe a control point rather than a physical address of a particular I/O module and as such may be given names that reflect the logic of the control program or the function of the control point. These operand names will be henceforth referred to as "software addresses" because they are not dependent on the physical address of the I/O module. In the present embodiment of the invention, the software addresses 83 includes an extension indicating a subaddress within an given I/O module and thus is trivially related to the physical address of the control point, nevertheless, the physical address of the I/O module itself is not provided by the software address 83.

I/O MAP TABLE

Memory 64 also includes an I/O map table 84 shown as a five-column multi-row table where elements in each row are linked together. Each software address 83, including all of its extensions, associated with a particular I/O module, starts a separate row of the I/O map table 84. Thus, the I/O map table 84 links software addresses 83 identifying a particular I/O module 20 to information about the I/O module 20.

The first piece of information after the software address, in each row of the I/O map table 84, is the physical address 85 of the I/O module 20 providing the interface between the control point 23 and the industrial control system 10 identified by the software address 83.

Figure 3:
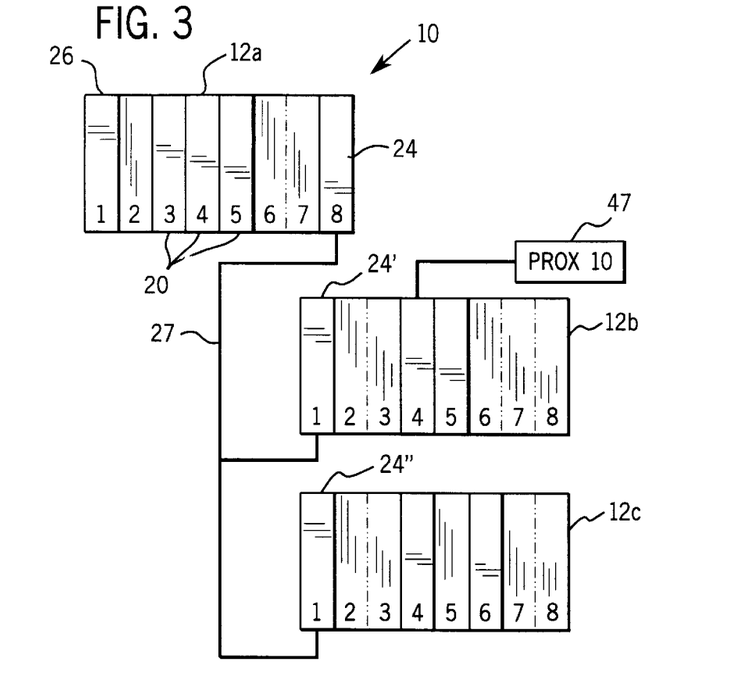
FIG. 3 is a schematic representation of an industrial controller similar to that of FIG. 1 having multiple I/O modules, both within the rack of the industrial controller and in two other racks and showing the attachment of a proximity sensor to one such I/O module.
Figure 4:
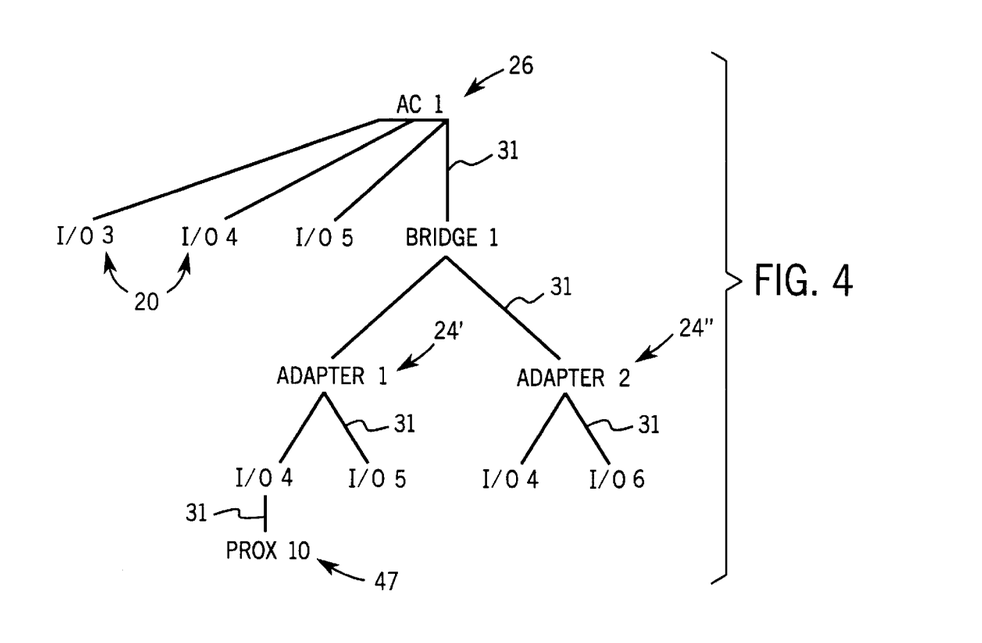
FIG. 4 is a tree diagram of the controller of FIG. 3 showing the topology of the communication network between the controller and the various I/O modules such as determines the physical address of the I/O modules.

Referring to FIGS. 3 and 4, the determination of the physical addresses 85 will be described with respect to a more complex control system incorporating a central controller 26 in a rack 12A having three I/O modules 20 at slots 3, 4, and 5 of an 8-slot rack. These slot numbers provide part of the physical address of the I/O modules 20 which for clarity will be assumed to equal the slot number, although in practice the address of the first slot is normally zero. At slot 8 of rack 12A, a "bridge" communication module 24 connects the rack to a communications link 27 received by adapters 24' and 24" of racks 12B and 12C. The adapters are in slots 1 of each rack. In rack 12B, there are two I/O modules at slot locations 4 and 5, and I/O module at slot location 4 has a proximity switch 47 attached to it. At rack 12C, there are I/O modules at slot locations 4 and 6.

Referring now to FIG. 4, the topology of the network shown in the control system of FIG. 3 may be represented as a tree diagram with the central controller 26 designated by the symbol AC1 and having direct connections shown by branches of the tree 31 to I/O modules at slot locations 3, 4, and 5, designated by the symbols I/O3, I/O4, and I/O5. The central controller 26 also connects directly to a bridge designated bridge 1. Additional branches 31 extending from bridge 1 are received by adapter 1 of rack 12B and adapter 2 of rack 12C. Adapter 1 communicates to 2 I/O modules through its own branches 31, designated I/O4 and I/O5 indicating the relative slot addresses of the particular I/O modules 20. A single branch 31 extends down to the symbol PROX 10, standing for the proximity switch 47. Similarly, branches 31 extending down from adapter 2 are received by I/O modules designated I/O4 and I/O6.

The topology shown in FIG. 4 provides the physical address of each I/O module. Thus the I/O module to which the proximity switch 47 is attached has the address AC1/BR1/AD1/4 indicating that it is attached to the automation controller 1 (the only automation controller) through the first bridge (the only bridge) to the adapter 1 and to the third slot in adapter 1 where there is an I/O module. The physical address does not designate the terminal of a multi-terminal I/O module 20 to which the proximity switch is connected, this terminal, as has been described above, is designated by an extension to the software address.

Referring now again to FIG. 5, the physical address is represented as described above with respect to particular I/O modules 20. Thus, the software addresses 83 used in the control program through the I/O map table may be linked to physical addresses 85 of actual hardware providing interface to the particular connection point needed for the control program.

While in theory all data transfers between the controlled equipment 25 and the central controller 26 could be mediated by the I/O map table 84 with the address of incoming messages from a particular physical address matched to a software address 83 and software addresses 83 from the control program matched to physical addresses, both by a look-up in the I/O map table 84, this procedure would be extremely time consuming in a typical real-time control process have large amounts of input and output data.

For this reason, a direct look-up of the link between software addresses 83 and physical addresses 85 is avoided by use of connected messaging between I/O and controller and the use of a connection record and data table as will be described.

Figure 6:
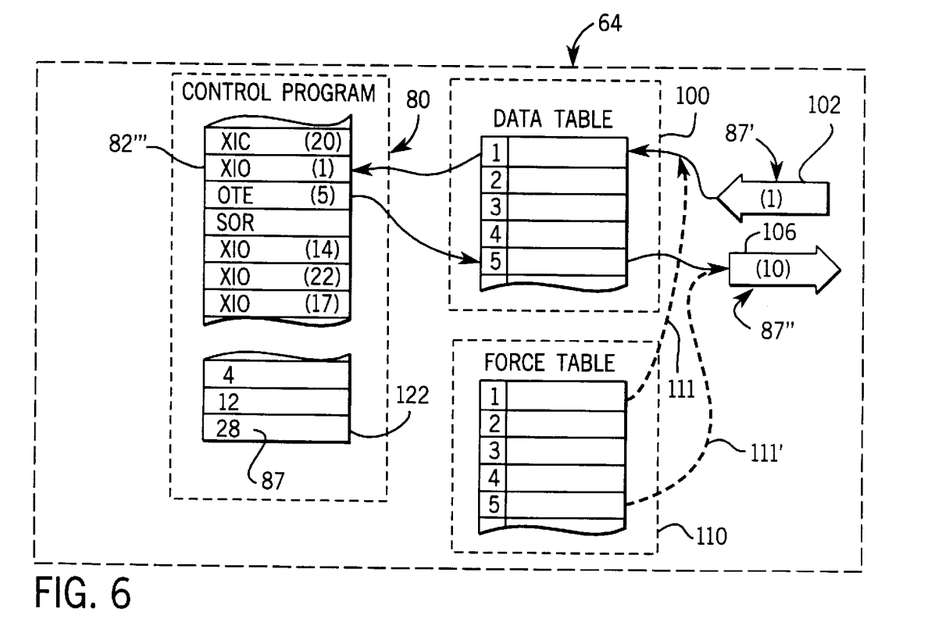
FIG. 6 is a figure similar to that of FIG. 5 showing the control program after compilation and the use of a data table to increase the speed of I/O access.

Referring to FIGS. 2 and 6, after the I/O map table 84 is generated by the user, the control program 80 is modified prior to execution to control a process, by replacing the software addresses 83 in the control program with addresses in a data table 100 in memory 64. Thus, all reads and writes from the control program 80 are simply internal reads and writes by the processor 62 to the data table 100 as will be described. Communication between the I/O modules 20 and the data table 100 then occurs asynchronously, without using the processor 62, but under the direction of the communication processor 58. Because the processor 62 is not involved with the refreshing of the data table 100, the process of refreshing the data table does not directly affect the speed of the execution of the control program.

At the end of the control program 80 is appended an output list 122 of all software addresses which are referred to by output instructions, i.e., those instructions that would require data to be transmitted to an I/O module. This output list 122 is used during the asynchronous transmission of information written to the data table 100 to the I/O modules. Only the data of the software addresses on this list are transmitted.

The communication processor 58 refreshes the data in the data table 100 by the use of the technique of "connected" messages, each carrying a unique message ID so as to direct that message through the network. In connected messaging the source of each message sends the message out onto the network with a unique connection identification number indicating its ultimate destination to one or more devices on the network. The connection identification number is used by the various bridges and adapters of the network to identify pre-allocated resources for the message, such as buffers and channel priority, to direct the message through the networks, and to identify the source of the message at the destination. I/O modules 20 use a particular connection identification number for their messages to the central controller 26 used to route those messages to the correct addresses of the data table 100. Likewise, the central controller 26 attaches appropriate connection identification numbers to the messages it sends to the I/O modules 20 to ensure the output data in the data table 100 is sent to the correct I/O module 20.

One or more connection identification numbers 87 can be listed in the I/O map table 84. Generally there will be only one connection identification number 87 for a given control point 23 in the controlled process 12.

Referring still to FIG. 5, a connection record 90, contained in memory 64, and depicted as a three column multi-row table is generated for the information in the I/O map table 84. In a first column of the connection record 90 connection identification numbers 87 are provided identifying a connection between the central controller 26 and an I/O module. These connection identification numbers 87 are linked to columns 94 providing a range of addresses within the data table 100 related to the information transmitted by that connection. The range of addresses is provide as a data table pointer 95 indicating the starting address of the data table 100 associated with the connection and a size 97 indicating the number of locations in the data table 100 needed to hold the data of that connection. Thus for proximity switch 10 (47) the data is stored at data table 100 address 1 and is one word long. In practice there are two data tables 100 one for input data and one for output data. These two tables and their separate entries in the connection record 90 are depicted as one table for clarity.

It is the connection identification numbers 87 that are stored in the output list 122, mentioned above, and used to transmit information from the data table 100 to the I/O modules 20 as will be described below.

Referring also to FIG. 6, an incoming message 102 from an I/O module 20 (in this example I/O 4 to which the proximity switch 47 is attached) will carry with it a connection identification number 87' previously assigned to that connection based on information in the I/O map table 84 and according to techniques well known in the art. The connection identification number 87' (here shown as number 1) is used to look up connection information in the connection record 90. In this case, the information looked up is a location and size in the data table 100, in this case the location of 1 and the size of 1 indicated by the first row in the data table 100. The data of message 102 is then stored in the data table 100 and during execution of the control program 80 may be read by the control program instruction 82''' directly from the data table 100.

At the conclusion of the control program 80, similar messages 106 are transmitted to the I/O modules 20 from the central controller 26. At a regular interval or at the conclusion of one execution cycle of the program 80, the output list 122 is examined and each of the connection identification numbers 87 contained in output list 122 is applied to the connection record 90 to locate a corresponding section of the data table 100. Information from the data table 100 at this location is transmitted in a message 106 to the I/O module with the connection identification numbers 87" equal to the connection identification number originally examined in the output list 122.

The connected messaging system sends data in discrete packets each having a connection identification number 87 uniquely identifying that connection and the particular path of the connection. The packet with the connection identification number 87 is transmitted onto the network and routed by the various nodes of the network based on information stored at those nodes during the opening of the connection.

Thus, referring to FIG. 3, a connected message sent from the central controller 26 to the proximity switch 47 first requires opening of a connection between those points by establishing a connection table at each of the central controller 26 bridge 24 and adapters 24' indicating a routing of that packet when it is received to the proper source. The connection records at each of these nodes also include information allocating space in the buffer memory at the node for receiving the message, as well as scheduling information known in the art. Co-pending U.S. patent application Ser. No. 08/212,533 entitled Deterministic Communications Network for Industrial Control and assigned to the same assignee as the present invention describes a connection system employing this technique and is hereby incorporated by reference.

Referring again to FIG. 5, the physical address in the I/O map table 84 is used in opening the initial connection and after that point, only the connection identification number 87 is required. For this reason, the communication process may be extremely fast requiring only a matching of a connection identification numbers with data in the connection record 90.

Although the I/O map table 84 is not accessed directly during the operation of the industrial control system 10, insofar as it contains a complete listing of software addresses and physical addresses the latter described by the path through the network, the I/O map table 84 may be used to generate a picture of the network topology per FIG. 4.

A fourth column of the I/O map table 84 includes a mode entry 89 indicating whether the particular data from the I/O module should be "forced" or not. Forcing is the use of a predetermined value in the control program 80 instead of the actual value received from the I/O module 20 or outputting a predetermined value to the I/O module 20 instead of the actual value generated by the control program 80. Forcing is useful for trouble shooting control programs. If the I/O map table 84 indicates that a particular software address 83 is to be forced then instead of using values in the data table 100, the industrial control system 10 uses values in a forcing table 110. The connection record includes a second column 99 providing a range of addresses within the forcing table 110 related to the information transmitted by that connection. The range of addresses is provided in the form of a forcing table pointer indicating the starting address of the forcing table 110 associated with the connection and a size indicating the number of locations in the forcing table 110 needed to hold the data of that connection—just as in the column 94. When an incoming message 102 is received, at the time the connection record 90 is interrogated, the mode 89 is examined. If the mode indicates forcing, the column 99 is used to obtain the predetermined data from the forcing table 110 and that data, shown as arrow 111, is combined with the data of the message 102 according to a specific Boolean combination (e.g., exclusive OR) and that combined or forced data is placed in the data table 100 at the addresses indicated by column 94 of the connection record 90. Conversely, at the time the output list 122 is examined to output data to the I/O modules 20, the mode 89 is also examined and if forcing is indicated, the data from the forcing table 110 identified by column 99, and shown as arrow 111', is combined with the data from the data table 100 and the combination output via message 106. Forcing can thus be accomplished on a module by module basis and with essentially no increase in burden to the processor 62.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A method of operating an industrial controller having a central processor executing a stored control program to exchange data with a plurality of input/output modules distributed over a network at physical network addresses to provide an electrical interface at control points to a controlled process, the method comprising the steps of:

(a) entering the control program into the controller, the program having steps where data is exchanged with a particular control point in the controlled process designated by a software address in the control program and not dependent on a physical address;

(b) entering an I/O map table into the controller linking the software address to a physical network address of a particular input/output module serving as the electrical interface with the control point;

(c) operating the controller to exchange data with the control point through the particular I/O module at the physical network address linked to the software address by the I/O map table; and (d) transmitting the programming information to the input/output module to program the input output module;

wherein the input/output module includes a programmable electronic computer and wherein the I/O map table also relates the software address to programming information for the programmable electronic computer of the particular input/output module.

2. The method of claim 1 wherein the network includes branches forming different routes along which data may pass and wherein physical addresses in the I/O map table describes a route through the network.

3. A method of operating an industrial controller having a central processor executing a stored control program to exchange data with a plurality of input/output modules distributed over a network at physical network addresses to provide an electrical interface at control points to a controlled process, the method comprising the steps of:

(a) entering the control program into the controller, the program having steps where data is exchanged with a particular control point in the controlled process designated by a software address in the control program;

(b) entering an I/O map table into the controller linking the software address to a physical network address of a particular input/output module serving as the electrical interface with the control point; and (c) operating the controller to exchange data with the control point through the particular I/O module at the physical network address linked to the software address by the I/O map table;

wherein the controller operates to exchange data with the control point at step (c) by:

(i) replacing a software address in the control program with an address in a data table stored in the controller; and (ii) exchanging data between the particular I/O module and the address of the data table using the physical address contained in the I/O map table and linked to the replaced software address;

(d) wherein the exchange of data between the particular I/O module and the data table is accomplished by:

I. assigning a message from the particular I/O module to a connection identification number;

II. generating a connection record in the controller from the I/O map table, the connection record linking the connection identification number to the address in the data table;

III. upon receipt of the message for the particular I/O module, looking up the connection identification number in the connection record to find the address in the data table to receive the message from the particular I/O module; and IV. writing the message to the address of the data table indicated by the connection record.

4. A method of operating an industrial controller having a central processor executing a stored control program to exchange data with a plurality of input/output modules distributed over a network at physical network addresses to provide an electrical interface at control points to a controlled process, the method comprising the steps of:

(a) entering the control program into the controller, the program having steps where data is exchanged with a particular control point in the controlled process designated by a software address in the control program and not dependent on a physical address;

(b) entering an I/O map table into the controller linking the software address to a physical network address of a particular input/output module serving as the electrical interface with the control point;

(c) operating the controller to exchange data with the control point through the particular I/O module at the physical network address linked to the software address by the I/O map table;

(d) entering into the I/O map table the second software address linked to the physical network addresses of the second industrial controller; and (e) operating the controller to exchange data with the second industrial controller at the physical network address linked to the second software address by the I/O map table;

wherein the industrial controller also executes the stored control program to exchange data with a second industrial controller, the second industrial controller having a physical network address, wherein at step (a) the control program entered into the controller has steps where data is exchanged with the second industrial controller designated by a second software address in the control program.

5. The method of claim 3 including the step of:

entering a forced value table having an entry for each address of the data table;

wherein the connection record includes an indication of whether forcing of the data of the particular I/O module is desired; and wherein step IV writes the message to the data table at the address only if the connection record indicates that forcing is not desired and otherwise writes the message as masked by data in the forcing table at a corresponding location to the address in the data table, to the address in the data table.

6. A method of operating an industrial controller having a central processor executing a stored control program to exchange data with a plurality of input/output modules distributed over a network at physical network addresses to provide an electrical interface at control points to a controlled process, the method comprising the steps of:

(a) entering the control program into the controller, the program having steps where data is exchanged with a particular control point in the controlled process designated by a software address in the control program;

(b) entering an I/O map table into the controller linking the software address to a physical network address of a particular input/output module serving as the electrical interface with the control point; and (c) operating the controller to exchange data with the control point through the particular I/O module at the physical network address linked to the software address by the I/O map table;

wherein the controller operates to exchange data with the control point at step (c) by:

(i) replacing a software address in the control program with an address in a data table stored in the controller; and (ii) exchanging data between the particular I/O module and the address of the data table using the physical address contained in the I/O map table and linked to the replaced software address;

wherein the exchange of data between the particular I/O module and the data table is accomplished by:

I. collecting a list of data needed to be transmitted to a particular I/O module identified by a connection identification number recognized by the particular I/O module;

II. generating a connection record in the controller from the I/O map table linking the connection identification number to the address in location in the data table;

III. on a periodic basis, reading the data table at the address and transmitting a message containing the data in the data table at the address to the particular I/O module, the message incorporating the connection identification number;

wherein the connection identification number causes the network to route the message to the physical address of the particular I/O module.

7. The method of claim 6 wherein including the step of:

entering a forced value table having an entry for each address of the data table;

wherein the connection record includes an indication of whether forcing of the data of the particular I/O module is desired; and wherein step III transmits the message containing the data in the data table at the address to the particular I/O module only if the connection record indicates that forcing is not desired and otherwise transmits a message containing the data in the data table at the address to the particular I/O module, the message masked by data in the forcing table at a corresponding location to the location in the data table.

8. A method of operating an industrial controller having a central processor executing a stored control program to exchange data with a plurality of input/output modules distributed over a network at physical network addresses to provide an electrical interface at control points to a controlled process, the method comprising the steps of:

(a) entering the control program into the controller, the program having steps where data is exchanged with a particular control point in the controlled process designated by a software address in the control program and not dependent on a physical address;

(b) entering an I/O map table into the controller linking the software address to a physical network address of a particular input/output module serving as the electrical interface with the control point;

(c) operating the controller to exchange data with the control point through the particular I/O module at the physical network address linked to the software address by the I/O map table; and (d) displaying the network topology as recorded in the I/O mapping table;

wherein the network includes branches forming different routes along which data may pass and wherein physical addresses in the I/O map table describes a route through the network.

* * * * *